United States Patent
Oguro et al.

(10) Patent No.: US 11,078,330 B2
(45) Date of Patent: Aug. 3, 2021

(54) POLYAMIDE RESIN COMPOSITION, MOLDED ARTICLE, AND METHOD FOR MANUFACTURING POLYAMIDE RESIN PELLET

(71) Applicant: Mitsubishi Gas Chemical Company, Inc., Tokyo (JP)

(72) Inventors: Hatsuki Oguro, Hiratsuka (JP); Tomonori Kato, Hiratsuka (JP); Ryusuke Yamada, Hiratsuka (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 35 days.

(21) Appl. No.: 16/471,799

(22) PCT Filed: Dec. 6, 2017

(86) PCT No.: PCT/JP2017/043876
§ 371 (c)(1),
(2) Date: Jun. 20, 2019

(87) PCT Pub. No.: WO2018/116837
PCT Pub. Date: Jun. 28, 2018

(65) Prior Publication Data
US 2020/0087459 A1 Mar. 19, 2020

(30) Foreign Application Priority Data
Dec. 22, 2016 (JP) .............................. JP2016-248951

(51) Int. Cl.
| | | |
|---|---|---|
| *C08G 69/26* | (2006.01) | |
| *C08G 69/28* | (2006.01) | |
| *C08J 3/20* | (2006.01) | |
| *C08K 3/40* | (2006.01) | |
| *C08K 7/14* | (2006.01) | |
| *C10M 107/44* | (2006.01) | |
| *C10M 125/28* | (2006.01) | |
| *C10M 169/04* | (2006.01) | |
| *C10N 50/08* | (2006.01) | |

(52) U.S. Cl.
CPC .......... *C08G 69/265* (2013.01); *C08G 69/28* (2013.01); *C08J 3/201* (2013.01); *C08K 3/40* (2013.01); *C08K 7/14* (2013.01); *C10M 107/44* (2013.01); *C10M 125/28* (2013.01); *C10M 169/04* (2013.01); *C10M 2201/12* (2013.01); *C10M 2217/0443* (2013.01); *C10N 2050/08* (2013.01)

(58) Field of Classification Search
CPC ........ C08G 69/265; C08G 69/28; C08J 3/201; C08K 3/40; C08K 7/14; C10M 107/44; C10M 125/28; C10M 169/04; C10M 2201/12; C10M 2217/0443; C10N 2050/08
See application file for complete search history.

(56) References Cited

U.S. PATENT DOCUMENTS

| | | | |
|---|---|---|---|
| 5,414,042 A * | 5/1995 | Yasue ...................... | C08K 3/34 523/216 |
| 2012/0094048 A1 | 4/2012 | Mitadera et al. | |
| 2013/0062806 A1 | 3/2013 | Mitadera | |
| 2013/0066041 A1 | 3/2013 | Mitadera et al. | |
| 2013/0303367 A1 | 11/2013 | Oda et al. | |
| 2014/0120289 A1 | 5/2014 | Arakawa et al. | |
| 2014/0127440 A1 | 5/2014 | Norfolk et al. | |
| 2015/0048539 A1 | 2/2015 | Mitadera | |
| 2016/0237597 A1 | 8/2016 | Nakai et al. | |
| 2016/0280856 A1 * | 9/2016 | Kanda ................... | C08G 69/26 |
| 2016/0376407 A1 | 12/2016 | Tsunaka et al. | |

FOREIGN PATENT DOCUMENTS

| | | |
|---|---|---|
| CN | 102459465 A | 5/2012 |
| CN | 102918080 A | 2/2013 |
| CN | 103619956 A | 3/2014 |
| CN | 103804902 A | 5/2014 |
| CN | 105377947 A | 3/2016 |
| CN | 105764956 A | 7/2016 |
| CN | 106117549 A | 11/2016 |
| EP | 3412705 A1 | 12/2018 |
| JP | 2011-057932 A | 3/2011 |
| JP | 2011-057977 A | 3/2011 |
| JP | 2012-131918 A | 7/2012 |
| JP | 2013-064420 A | 4/2013 |
| JP | 2014-111757 A | 6/2014 |
| JP | 2015-017178 A | 1/2015 |
| JP | 2015-098669 A | 5/2015 |
| JP | 2015-129244 A | 7/2015 |
| JP | 2017-052819 A | 3/2017 |

(Continued)

OTHER PUBLICATIONS

Bell et al. Polyamide of 1,4-cyclohexanebis(methylamine), 1965, Journal of Polymer Science:Part A, col. 3, pp. 19-30 (Year: 1965).*

(Continued)

*Primary Examiner* — Cephia D Toomer
(74) *Attorney, Agent, or Firm* — Fitch, Even, Tabin & Flannery, LLP

(57) ABSTRACT

Provided is a polyamide resin composition capable of providing a molded article having an excellent wear resistance while maintaining a high mechanical strength; a molded article; and a method for manufacturing a polyamide resin pellet. The polyamide resin composition includes a polyamide resin and an inorganic filler, wherein the polyamide resin includes diamine-derived constituent units and dicarboxylic acid derived constituent units; 70 mol % or more of the diamine-derived constituent units are derived from 1,4-bis(aminomethyl)cyclohexane; a molar ratio of cis:trans of the 1,4-bis(aminomethyl)cyclohexane is from 35:65 to 0:100; 70 mol % or more of the dicarboxylic acid-derived constituent units are derived from an α,ω-linear aliphatic dicarboxylic acid having from 8 to 12 carbons; and the polyamide resin includes phosphorus atoms in a ratio of from 20 to 100 mass ppm and comprises calcium atoms so as to be phosphorus atoms:calcium atoms of 1:0.3 to 0.7 in a molar ratio.

8 Claims, No Drawings

(56) References Cited

FOREIGN PATENT DOCUMENTS

| TW | 201231554 A1 | 8/2012 |
| TW | 201529724 A | 8/2015 |
| WO | 2012/014772 A1 | 2/2012 |
| WO | 2012/140785 A1 | 10/2012 |
| WO | 2015/091478 A1 | 6/2015 |

OTHER PUBLICATIONS

Extended European Search Report issued in corresponding European Application No. 17884502.0 dated Nov. 25, 2019 (6 pages).
International Preliminary Report on Patentability and Written Opinion for PCT/JP2017/043876, dated Feb. 27, 2018, and English Translation submitted herewith (23 pages).
International Search Report for PCT/JP2017/043876, dated Feb. 27, 2018, and English Translation submitted herewith (5 pages).
Office Action dated Feb. 18, 2021, in corresponding Chinese Patent Application No. 201780078497.0.
Office Action dated May 17, 2021, in corresponding Taiwanese Patent Application No. 106143851.

\* cited by examiner

POLYAMIDE RESIN COMPOSITION, MOLDED ARTICLE, AND METHOD FOR MANUFACTURING POLYAMIDE RESIN PELLET

CROSS-REFERENCE TO RELATED APPLICATIONS

This application is a U.S. national phase application filed under 35 U.S.C. § 371 of International Application Number PCT/JP2017/043876, filed Dec. 6, 2017, designating the United States, which claims priority from Japanese Application Number 2016-248951, filed Dec. 22, 2016.

FIELD OF THE INVENTION

The present invention relates to a polyamide resin composition, a molded article, and a method for manufacturing a polyamide resin pellet.

BACKGROUND OF THE INVENTION

The use of polyamide resins in sliding parts has been studied. For example, Patent Document 1 discloses a sliding member (a sliding part) including a polyamide resin composition, the composition containing 100 parts by mass of a polyamide and from 0.5 to 60 parts by mass of a sliding modifier, the polyamide including a terephthalic acid component and a 1,10-decanediamine component. In addition, Patent Document 2 discloses a resin composition for a wear resistant molded article, the resin composition including a bundle of fibers impregnated with a resin, the bundle of fibers being prepared by bundling a fibrous filler in a state aligned in a length direction, impregnating the bundle of the fibrous filler with a polyamide in a melted state to integrate the bundle and the polyamide, and then cutting the integrated bundle into pieces of from 5 to 15 mm in length, wherein the polyamide is an aromatic polyamide obtained from an aromatic dicarboxylic acid and an aliphatic diamine; or an aliphatic dicarboxylic acid and an aromatic diamine, the fibrous filler is selected from carbon fiber, glass fiber, aramid fiber, and basalt fiber, and in a wear test using the resin composition, no peeling of the surface can be confirmed visually.

CITATION LIST

Patent Documents

Patent Document 1: JP 2013-64420 A
Patent Document 2: JP 2012-131918 A

SUMMARY OF INVENTION

As described above, an excellent wear resistance is required for sliding parts using a polyamide resin. However, the present inventor investigated to find that in a case where the polyamide resin composition described above is used, the wear resistance may be insufficient, or even in a case where the wear resistance is excellent, mechanical strength may be poor. An object of the present invention is to solve the problems described above and to provide a polyamide resin composition capable of providing a molded article having an excellent wear resistance while maintaining a high mechanical strength; a molded article using the polyamide resin composition; and a method for manufacturing a polyamide resin pellet.

Under such circumstances, the present inventor, as a result of the study, found that the above problems can be solved by using a polyamide resin including 1,4-bis(aminomethyl)cyclohexane and an $\alpha,\omega$-linear aliphatic dicarboxylic acid having from 8 to 12 carbons; and setting a molar ratio of cis:trans of 1,4-bis(aminomethyl)cyclohexane in a range of from 35:65 to 0:100. Specifically, the problems described above have been solved by the following means (1) and preferably (2) to (8).

(1) A polyamide resin composition including a polyamide resin and an inorganic filler, wherein the polyamide resin includes diamine-derived constituent units and dicarboxylic acid derived constituent units; 70 mol % or more of the diamine-derived constituent units are derived from 1,4-bis(aminomethyl)cyclohexane; a molar ratio of cis:trans of the 1,4-bis(aminomethyl)cyclohexane is from 35:65 to 0:100; 70 mol % or more of the dicarboxylic acid derived constituent units are derived from an $\alpha,\omega$-linear aliphatic dicarboxylic acid having from 8 to 12 carbons; and the polyamide resin includes phosphorus atoms in a ratio of from 20 to 100 mass ppm and comprises calcium atoms so as to be phosphorus atoms:calcium atoms of 1:0.3 to 0.7 in a molar ratio.

(2) The polyamide resin composition according to (1), wherein the inorganic filler is an inorganic filler containing glass as a main component.

(3) The polyamide resin composition according to (1), wherein the inorganic filler is glass fiber.

(4) The polyamide resin composition according to any one of (1) to (3), including the inorganic filler in a ratio of from 35 to 65 mass % of the polyamide resin composition.

(5) The polyamide resin composition according to any one of (1) to (4), which is a pellet.

(6) A molded article formed by molding the polyamide resin composition described in any one of (1) to (5).

(7) The molded article according to (6), wherein the molded article is a sliding part.

(8) A method for manufacturing a polyamide resin pellet, the method including: adding an inorganic filler to a polyamide resin to form a mixture; and melt-kneading the mixture, wherein the polyamide resin includes diamine-derived constituent units and dicarboxylic acid derived constituent units; 70 mol % or more of the diamine-derived constituent units are derived from 1,4-bis(aminomethyl)cyclohexane; a molar ratio of cis:trans of the 1,4-bis(aminomethyl)cyclohexane is from 35:65 to 0:100; 70 mol % or more of the dicarboxylic acid-derived constituent units are derived from an $\alpha,\omega$-linear aliphatic dicarboxylic acid having from 8 to 12 carbons; and the polyamide resin includes phosphorus atoms in a ratio of from 20 to 100 mass ppm and comprises calcium atoms so as to be phosphorus atoms:calcium atoms of 1:0.3 to 0.7 in a molar ratio.

According to the present invention, it has become possible to provides a polyamide resin composition capable of providing a molded article having an excellent wear resistance while maintaining a high mechanical strength; a molded article using the polyamide resin composition; and a method for manufacturing a polyamide resin pellet.

DESCRIPTION OF EMBODIMENTS

The contents of embodiments of the present invention will be described in detail below. In the present specification, "from . . . to . . . ", "of . . . to . . . ", or " . . . to . . . " is used in a sense that the numerical values described before and after "to" are included as the lower limit value and the upper limit value, respectively.

The polyamide resin composition according to an embodiment of the present invention includes a polyamide resin and an inorganic filler, wherein the polyamide resin includes diamine-derived constituent units and dicarboxylic acid derived constituent units; 70 mol % or more of the diamine-derived constituent units are derived from 1,4-bis (aminomethyl)cyclohexane; a molar ratio of cis:trans of the 1,4-bis(aminomethyl)cyclohexane is from 35:65 to 0:100; 70 mol % or more of the dicarboxylic acid-derived constituent units are derived from an α,ω-linear aliphatic dicarboxylic acid having from 8 to 12 carbons; and the polyamide resin includes phosphorus atoms in a ratio of from 20 to 100 mass ppm and comprises calcium atoms so as to be phosphorus atoms:calcium atoms of 1:0.3 to 0.7 in a molar ratio. Such a configuration can provide a molded article having an excellent wear resistance while maintaining a high mechanical strength.

Polyamide Resin

The polyamide resin used in an embodiment of the present invention is a polyamide resin including diamine-derived constituent units and dicarboxylic acid derived constituent units, wherein 70 mol % or more of the diamine-derived constituent units are derived from 1,4-bis(aminomethyl)cyclohexane (hereinafter this may be referred to as "1,4-BAC"); a molar ratio of cis:trans of the 1,4-bis(aminomethyl)cyclohexane is from 35:65 to 0:100; 70 mol % or more of the dicarboxylic acid-derived constituent units are derived from an α,ω-linear aliphatic dicarboxylic acid having from 8 to 12 carbons; and the polyamide resin includes phosphorus atoms in a ratio of from 20 to 100 mass ppm and includes calcium atoms in a molar ratio of phosphorus atoms:calcium atoms of 1:0.3 to 0.7 (hereinafter the polyamide resin may be referred to as "1,4-BAC10").

In an embodiment of the present invention, the molar ratio of the trans-isomer of the raw material 1,4-BAC is increased, thus providing a molded article having an excellent wear resistance while maintaining a high mechanical strength. The mechanism behind this is presumably attributed to a successful increase in the crystallinity of the resulting polyamide resin (1,4-BAC10).

Here, the higher the molar ratio of the trans-isomer of 1,4-BAC is, which is the raw material monomer, the higher a melting point is, and the sodium hypophosphite can become liable to decompose during synthesis. In a laboratory scale, reaction temperature and the amount of sodium hypophosphite can be carefully controlled for synthesis, but in view of industrial production, it is advantageous if a compound other than sodium hypophosphite can be used as an antioxidant (phosphorus-containing compound). Thus, in an embodiment of the present invention, calcium hypophosphite is preferably used as an antioxidant (phosphorus-containing compound) to be used in the synthesis of the polyamide resin (1,4-BAC10).

Furthermore, calcium salts, such as calcium hypophosphite, have a low solubility in an α,ω-linear aliphatic dicarboxylic acid having from 4 to 20 carbons, and thus when a larger amount of calcium salt is added, white foreign matter may occur, resulting in a poor appearance of the molded article. Thus, the ratio of phosphorus atoms to calcium atoms of the polyamide resin (1,4-BAC10) is set as described above, and the appearance of the resulting molded article can be improved.

In an embodiment of the present invention, 70 mol % or more of the diamine-derived constituent units are derived from 1,4-bis(aminomethyl)cyclohexane. Of the diamine derived-constituent units, preferably 71 mol % or more, more preferably 75 mol % or more, still more preferably 80 mol % or more, even more preferably 90 mol % or more, even still more preferably 95 mol % or more, particularly preferably 98 mol % or more, and more particularly preferably 99 mol % or more are derived from 1,4-bis(aminomethyl)cyclohexane.

Diamines other than 1,4-bis (aminomethyl)cyclohexane are exemplified by aliphatic diamines, such as 1,3-bis(aminomethyl)cyclohexane, tetramethylene diamine, pentamethylene diamine, hexamethylene diamine, octamethylene diamine, and nonamethylene diamine; and aromatic diamines, such as para-phenylene diamine, meta-xylylene diamine, and para-xylylene diamine. Only one type of these other diamines; or two or more types thereof may be used.

The raw material diamine of the polyamide resin (1,4-BAC10), 1,4-bis(aminomethyl)cyclohexane, has cis- and trans-isomers. In an embodiment of the present invention, a molar ratio of cis:trans of 1,4-bis(aminomethyl)cyclohexane is from 35:65 to 0:100, preferably from 32:68 to 0:100, more preferably from 30:70 to 0:100, still more preferably from 25:75 to 0:100, and even more preferably from 20:80 to 0:100. The raw material diamine with a cis:trans molar ratio in such a range provides a polyamide resin (1,4-BAC10) having a high crystallinity and a high melting point.

In an embodiment of the present invention, 70 mol % or more of the dicarboxylic acid-derived constituent units are derived from an α,ω-linear aliphatic dicarboxylic acid having from 8 to 12 carbons. Of the dicarboxylic acid-derived constituent units, preferably 80 mol % or more, more preferably 90 mol % or more, still more preferably 95 mol % or more, even more preferably 98 mol % or more, and even still more preferably 99 mol % or more are derived from an α,ω-linear aliphatic dicarboxylic acid having from 8 to 12 carbons.

The α,ω-linear aliphatic dicarboxylic acid having from 8 to 12 carbons is preferably suberic acid, azelaic acid, sebacic acid, 1,9-nonanedicarboxylic acid, and 1,10-decanedicarboxylic acid; and more preferably sebacic acid. One type of the α,ω-linear aliphatic dicarboxylic acids having from 8 to 12 carbons; or two or more types thereof may be used. Use of such a polyamide resin (1,4-BAC10) is preferred as it tends to lower the water absorption of the polyamide resin.

The dicarboxylic acids that can be used in addition to the α,ω-linear aliphatic dicarboxylic acid having from 8 to 12 carbons are exemplified by aliphatic dicarboxylic acids having 7 or less carbons and alicyclic dicarboxylic acids having from 6 to 12 carbons. Specific examples thereof include succinic acid, glutaric acid, adipic acid, 1,4-cyclohexane dicarboxylic acid, and 1,3-cyclohexanedicarboxylic acid. However, the ratio of isophthalic acid included in the polyamide resin (1,4-BAC10) used in an embodiment of the present invention is less than 10 mol %.

Furthermore, in addition to the diamine component and the dicarboxylic acid component, lactams, such as ε-caprolactam and laurolactam; and aliphatic aminocarboxylic acids, such as aminocaproic acid and aminoundecanoic acid, can also be used as a copolymerization component in the polyamide resin (1,4-BAC10) used in an embodiment of the present invention in a range that does not impair the effect of an embodiment of the present invention. The polyamide resin (1,4-BAC10) used in an embodiment of the present invention, however, includes the diamine-derived constituent units and the dicarboxylic acid-derived constituent units in typically 90 mol % or more, more preferably 95 mol % or more, still more preferably 98 mol % or more, even more preferably 99 mol % or more, and even still more preferably substantially 100 mol % of all the constituent units.

Various thermal properties and the crystallinity of the polyamide resin (1,4-BAC10) used in an embodiment of the present invention are preferably as follows. The polyamide resin with thermal properties in such a range exhibits the effect of an embodiment of the present invention more effectively. Furthermore, the thermal properties mentioned below are measured according to the methods described in the examples. However, in a case where it is difficult to obtain a measuring apparatus used in the examples because of being discontinued or the like, for example, the measurement shall be carried out by using any other apparatus having equivalent performance.

The polyamide resin (1,4-BAC10) used in an embodiment of the present invention has a melting point (Tm) of preferably 230° C. or higher, more preferably 240° C. or higher, still more preferably 250° C. or higher, even more preferably 256° C. or higher, even still more preferably 260° C. or higher, and further still more preferably 270° C. or higher.

The upper limit of the melting point is not particularly specified, but it may be, for example, 300° C. or lower.

The polyamide resin (1,4-BAC10) used in an embodiment of the present invention may have one or two or more melting points. In a case where the polyamide resin has two or more melting points, the lower limit of the preferred range of the melting point applies to the lowest melting point of the two or more melting points, and the upper limit of the preferred range of the melting point applies to the highest melting point of the two or more melting points.

The polyamide resin (1,4-BAC10) used in an embodiment of the present invention has a glass transition temperature (Tg) of preferably 80° C. or higher and more preferably 85° C. or higher. The upper limit of the glass transition temperature is not particularly specified, but it may be, for example, 150° C. or lower, also 130° C. or lower, particularly 120° C. or lower, and more particularly 110° C. or lower.

The polyamide resin (1,4-BAC10) used in an embodiment of the present invention has a crystallization temperature on heating (Tch) of preferably 160° C. or lower, more preferably 150° C. or lower, and still more preferably 140° C. or lower. The lower limit of the crystallization temperature on heating is preferably 115° C. or higher, more preferably 120° C. or higher, and still more preferably 122° C. or higher.

A crystallization temperature on cooling (Tcc) of the polyamide resin (1,4-BAC10) used in an embodiment of the present invention is preferably 180° C. or higher, and it may be 220° C. or higher. The upper limit of the crystallization temperature on cooling is preferably 260° C. or lower, and more preferably 255° C. or lower.

The polyamide resin (1,4-BAC10) used in an embodiment of the present invention has a crystallinity, which is determined by the following equation based on X-ray diffractometry, of preferably higher than 30%, more preferably 31% or higher, still more preferably 33% or higher, even more preferably 35% or higher, even still more preferably 38% or higher, and further still more preferably 40% or higher. The upper limit of the crystallinity is not particularly specified, but it is preferably 60% or lower and more preferably 55% or lower, and it can be 50% or lower, and further it can be 47% or lower. Crystallinity (%)=[area of crystalline peak/(area of crystalline peak+area of non-crystalline peak)]×100.

In an embodiment of the present invention, the preferred ranges of Tm, Tg, Tch, Tcc, and crystallinity above are preferably satisfied in combination of any two or more thereof. The polyamide resin with a crystallinity in such a range exhibits the effect of an embodiment of the present invention more effectively.

The polyamide resin (1,4-BAC10) used in an embodiment of the present invention includes phosphorus atoms in a ratio of from 20 to 100 mass ppm and calcium atoms in a ratio of phosphorus atoms:calcium atoms of 1:0.3 to 0.7. The polyamide resin containing phosphorus and calcium atoms in such a range improves the appearance of the resulting molded article.

The polyamide resin (1,4-BAC10) used in an embodiment of the present invention has a phosphorus atom concentration of preferably 25 mass ppm or higher, more preferably 30 mass ppm or higher, and still more preferably 35 mass ppm or higher. The upper limit of the phosphorus atom concentration is preferably 80 mass ppm or less, and more preferably 60 mass ppm or less, and still more preferably 50 mass ppm or less.

The polyamide resin (1,4-BAC10) used in an embodiment of the present invention has a molar ratio of phosphorus atoms:calcium atoms of 1:0.3 to 0.7, more preferably from 1:0.4 to 0.6, still more preferably from 1:0.45 to 0.55, and particularly preferably from 1:0.48 to 0.52. Phosphorus atoms and calcium atoms included in the polyamide resin (1,4-BAC10) used in an embodiment of the present invention are each preferably derived from calcium hypophosphite.

The method of measuring the phosphorus atom concentration and the calcium atom concentration follows the method described in the examples mentioned below.

The number average molecular weight of the polyamide resin (1,4-BAC10) used in an embodiment of the present invention is preferably from 6000 to 30000 and more preferably from 10000 to 25000.

The number average molecular weight (Mn) and the weight average molecular weight (Mw) of the polyimide resin (1,4-BAC10) can be determined in terms of polymethyl methacrylate (PMMA) standard by gel permeation chromatography (GPC) measurement.

More specifically, Mn and Mw can be measured by using two columns packed with a styrene-based polymer as a filler, and hexafluoroisopropanol (HFIP) containing sodium trifluoroacetate in a concentration of 2 mmol/L as solvent, under operating conditions of a resin concentration of 0.02 mass %, a column temperature of 40° C., and a flow rate of 0.3 mL/min, using a refractive index detector (RI). In addition, the calibration curve can be prepared by dissolving 6 levels of PMMA in HFIP.

The polyamide resin (1,4-BAC10) used in an embodiment of the present invention has a molecular weight distribution (weight average molecular weight/number average molecular weight (Mw/Mn)) preferably from 1.8 to 3.1. The molecular weight distribution is more preferably from 1.9 to 3.0 and still more preferably from 2.0 to 2.9. The polyamide resin having a molecular weight distribution in such a range tends to easily form composite materials having excellent mechanical properties.

The molecular weight distribution of the polyamide resin (1,4-BAC10) can be controlled by selecting as appropriate, for example, the type and amount of an initiator or a catalyst used during polymerization; and polymerization reaction conditions, such as reaction temperature, pressure, and time. In addition, the molecular weight distribution of the polyamide resin can be adjusted by mixing a plurality of polyamide resins (1,4-BAC10) having different average molecular weights, which are obtained by different polymerization conditions or by fractionally precipitating the polyamide resin (1,4-BAC10) after polymerization.

Method for Manufacturing Polyamide Resin

Next, an example of a method for manufacturing the polyamide resin (1,4-BAC10) used in an embodiment of the present invention will be described. The polyamide resin (1,4-BAC10) used in an embodiment of the present invention is preferably a polyamide resin manufactured by the method described below, but it is needless to say that it is not limited thereto.

The method for manufacturing the polyamide resin (1,4-BAC10) used in an embodiment of the present invention includes polycondensating a diamine and a dicarboxylic acid in the presence of calcium hypophosphite, wherein 70 mol % or greater of the diamine is 1,4-bis(aminomethyl)cyclohexane; a molar ratio of cis:trans of the 1,4-bis(aminomethyl)cyclohexane is from 35:65 to 0:100; and 70 mol % or greater of the dicarboxylic acid is an α,ω-linear aliphatic dicarboxylic acid having from 8 to 12 carbons.

When the polyamide resin synthesized in this manner in the presence of calcium hypophosphite, the obtained polyamide resin would satisfy the phosphorus atom concentration and the calcium atom concentration in the predetermined ranges. Here, a part or all of the calcium hypophosphite is transformed to, for example, calcium phosphite, calcium phosphate, and calcium polyphosphate by oxidation during polycondensation or secondary processing. Furthermore, the ratio of the phosphorus atom concentration to the calcium atom concentration varies with the conditions, such as the polycondensation conditions and the oxygen concentration during polycondensation. Therefore, there may be a case where no calcium hypophosphite is present in the polyamide resin obtained by the method for manufacturing the polyamide resin.

The polycondensation is typically a melt polycondensation method and preferably a method wherein the raw material diamine is added dropwise to the melted raw material dicarboxylic acid during the temperature increase under pressure while removing condensed water, to polymerize the mixture; or a method wherein a salt including the raw material diamine and the raw material dicarboxylic acid is heated under pressure in the presence of water while removing the added water and condensed water, to polymerize the salt in a melted state.

In an embodiment of the present invention, calcium hypophosphite is added so that the phosphorus atom concentration included in the polyamide resin is preferably 20 mass ppm or higher, and it may be added so that the phosphorus atom concentration is 25 mass ppm or higher or also 30 mass ppm or higher. Calcium hypophosphite is also added so that the upper limit of the phosphorus atom concentration is preferably 100 mass ppm or less, more preferably 80 mass ppm or less, and still more preferably 60 mass ppm or less.

Furthermore, during polycondensation, other alkali metal compounds may be added in combination with calcium hypophosphite. The addition of the alkali metal compound allows the amidation reaction rate to be controlled.

Furthermore, the molecular weight of the polyamide resin is preferably increased by solid-state polymerization.

Other polymerization conditions can be considered with reference to descriptions in JP 2015-098669 A and the pamphlet of WO 2012/140785, the contents of which are incorporated in the present specification.

Furthermore, details of the raw materials, such as diamines and dicarboxylic acids, are synonymous with those described for the polyamide resin (1,4-BAC10), and the preferred ranges are also similar.

The lower limit of the content of the polyamide resin (1,4-BAC10) used in an embodiment of the present invention in the polyamide resin composition in an embodiment of the present invention is preferably 35 mass % or greater, more preferably 37 mass % or greater, still more preferably 40 mass % or greater, and still more preferably 45 mass % or greater. The upper limit of the content is preferably 65 mass % or less, more preferably 60 mass % or less, and still more preferably 55 mass % or less, and it may be 53 mass % or less or 50 mass % or less.

The polyamide resin composition of an embodiment of the present invention may use only one type of the polyamide resin (1,4-BAC10) used in an embodiment of the present invention; or two or more types thereof. In a case where the polyamide resin composition of an embodiment of the present invention includes two or more types polyamide resins, the total amount is preferably within the range described above.

Inorganic Filler

The polyamide resin composition of an embodiment of the present invention is blended with an inorganic filler. The polyamide resin composition containing an inorganic filler can reinforce resulting molded articles and improve properties thereof, such as the rigidity, heat resistance, and dimensional stability.

The shape of the inorganic filler is not particularly limited, and it may be either fibrous, plate-like, granular, or needle-like, but it is preferably fibrous.

Specific examples of the inorganic filler include preferably inorganic fillers containing glass as a main component (glass fibers, glass flakes, glass beads, and milled fibers), alumina fibers, and carbon fibers; more preferably inorganic fillers containing glass as a main component and carbon fibers; still more preferably inorganic fillers containing glass as a main component; and even more preferably glass fibers. Here, 'containing glass as a main component' means that glass accounts for the largest amount of the components contained in the inorganic filler, and preferably 70 mass % or greater is glass, and more preferably 80 mass % or greater is glass.

In an embodiment of the present invention, the use of the inorganic filler can further improve the sliding properties.

The form of the glass fibers may be, for example, either glass roving or chopped strands, which are formed by continuously winding single fibers or strands of a plurality of fibers, and chopped strands are preferred.

The examples of the chopped strands include those with a number average fiber length (cut length) of from 1 to 10 mm. Additionally, the weight average fiber diameter of the chopped strand is preferably from 1 to 20 μm.

The composition of the raw material glass is preferably an alkali-free, and examples thereof include E glass, C glass, and S glass, but in an embodiment of the present invention, E glass is preferably used.

The glass fibers are preferably surface-treated with a surface treatment agent like a silane coupling agent, such as γ-methacryloxypropyltrimethoxysilane, γ-glycidoxypropyltrimethoxysilane, and γ-aminopropyltriethoxysilane. The deposition amount of the surface treatment agent is preferably from 0.01 to 1 mass % of the glass fibers. Furthermore, optionally, glass fibers surface-treated with a lubricant, such as a fatty acid amide compound and a silicone oil; an antistatic agent, such as a quaternary ammonium salt; a resin having film-forming ability, such as an epoxy resin and a urethane resin; or a mixture containing the components, such as a resin having film-forming ability, a thermal stabilizer, and a flame retardant; can be used.

The lower limit of the content of the inorganic filler in the polyamide resin composition of an embodiment of the present invention is preferably 20 mass % or greater, more preferably 35 mass % or greater, still more preferably 40 mass % or greater, and even more preferably 43 mass % or greater, and also it may be 45 mass % or greater, 47 mass % or greater, or 50 mass % or greater. The upper limit of the content is preferably 72 mass % or less, more preferably 65 mass % or less, still more preferably 63 mass % or less, and even more preferably 60 mass % or less, and it may be 55 mass % or less. In an embodiment of the present invention, the polyamide resin composition containing 40 mass % or greater or particularly 43 mass % or greater of the inorganic filler can significantly improve sliding properties.

The polyamide resin composition of an embodiment of the present invention may use only one type of the inorganic filler or two or more types thereof. In a case where two or more types thereof are contained therein, the total amount is preferably within the range described above.

In the polyamide resin composition of an embodiment of the present invention, the mass ratio of the polyamide resin (1,4-BAC10) to the inorganic filler (polyamide resin:inorganic filler) is preferably from 70:30 to 30:70, still more preferably from 58:42 to 30:70, even more preferably from 58:42 to 35:65, and further still more preferably from 55:45 to 35:65. With a mass ratio from 58:42 to 35:65, the polyamide resin composition more effectively can achieve improved sliding properties.

Other Components

The polyamide resin composition of an embodiment of the present invention may contain other components in addition to the polyamide resin (1,4-BAC10) and the inorganic filler used in an embodiment of the present invention.

Examples of the other components include other polyamide resins other than the polyamide resin (1,4-BAC10) used in an embodiment of the present invention, thermoplastic resins other than polyamide resins, and other additives.

Specific examples of the other polyamide resins include polyamide 6, polyamide 66, polyamide 46, polyamide 6/66 (copolymer including polyamide 6 component and polyamide 66 component), polyamide 610, polyamide 612, polyamide 11, polyamide 12, MXD6 (polymetaxylylene adipamide), MPXD6 (poly-meta-para-xylylene adipamide), MXD10 (polymetaxylylene sebacamide), MPXD10 (poly-meta-para-xylylene sebacamide), and PXD10 (polyparaxylylene sebacamide). One type each of these other polyamide resins; or two or more types thereof may be used.

Examples of the thermoplastic resins other than polyamide resins include polyester resins, such as polyethylene terephthalate, polybutylene terephthalate, polyethylene naphthalate, and polybutylene naphthalate. One type each of these thermoplastic resins other than polyamide resins; or two or more types thereof may be used.

Examples of the other additives include release agents, lubricants, stabilizers, flame retardants, fluorescent bleaches, plasticizers, antioxidants, UV absorbers, antistatic agents, and fluidity improvers. One type each of these additives or two or more types thereof may be used. The content of the other additives is preferably 5 mass % or less of the polyamide resin composition in total. Details of these additives can be considered with reference to descriptions in JP 2011-57977 A and JP 2015-129244 A, the contents of which are incorporated in the present specification.

Furthermore, the polyamide resin composition of an embodiment of the present invention can be configured to be substantially free of a calcium containing compound as an additive. 'Substantially free' means that the content is 3 mass % or less of the total amount of additives contained in the polyamide resin composition, and the content is preferably 1 mass % or less.

In addition, examples of another embodiment of the present invention include the polyamide resin composition including the polyamide resin (1,4-BAC10) and the inorganic filler, wherein the polyamide resin (1,4-BAC10) and the inorganic filler account for preferably 90 mass % or greater, more preferably 95 mass % or greater, and still more preferably 97 mass % or greater of the polyamide resin composition.

Method for Manufacturing Polyamide Resin Composition

The method for manufacturing the polyamide resin composition of an embodiment of the present invention is not particularly specified, and a well-known method for manufacturing thermoplastic resin compositions can be widely adopted. Specific examples of a method for manufacturing a polyamide resin composition include: adding an inorganic filler to a polyamide resin to form a mixture; and melt-kneading the mixture, wherein the polyamide resin includes diamine-derived constituent units and dicarboxylic acid derived constituent units; 70 mol % or more of the diamine-derived constituent units are derived from 1,4-bis(aminomethyl)cyclohexane; a molar ratio of cis:trans of the 1,4-bis (aminomethyl)cyclohexane is from 35:65 to 0:100; 70 mol % or more of the dicarboxylic acid-derived constituent units are derived from an α,ω-linear aliphatic dicarboxylic acid having from 8 to 12 carbons; and the polyamide resin includes phosphorus atoms in a ratio of from 20 to 100 mass ppm and calcium atoms in a molar ratio of phosphorus atoms:calcium atoms of 1:0.3 to 0.7. Such polyamide resin compositions are typically manufactured as pellets (polyamide resin pellets).

Specifically, the polyamide resin composition can be manufactured by premixing each component using various mixing machines, such as a tumbler and a Henschel mixer, and then melt-kneading the components using, for example, a Banbury mixer, a roll, a Brabender, a single screw extruder, a twin screw extruder, or a kneader.

In addition, the polyamide resin composition can also be manufactured by, for example, not mixing the components in advance or mixing only some of the components in advance, feeding the mixture into an extruder using a feeder to melt-knead the mixture.

Furthermore, the polyamide resin composition can also be manufactured by, for example, mixing some of the components in advance and feeding the mixture into an extruder to melt-knead the mixture to obtain a resin composition as a master batch, mixing the master batch with the remaining components again, and then melt-kneading the mixture.

Molded Article

Next, a molded article including the polyamide resin composition of an embodiment of the present invention will be described. The polyamide resin pellets obtained by pelletizing the polyamide resin composition of an embodiment of the present invention are molded by various molding methods to form molded articles. Furthermore, the polyamide resin composition melt-kneaded in an extruder can be molded directly to form a molded article without pelletizing the polyamide resin composition.

The shape of the molded article is not particularly limited and can be selected as appropriate depending on the application and purpose of the molded article. Examples thereof include plate-like, plate-shaped, rod-shaped, sheet-like, film-like, cylindrical, annular-shaped, circular-shaped, ovalshaped, gear-shaped, polygon-shaped, hollow-shaped, frame-shaped, box-shaped, and panel-shaped molded articles.

The method for forming the molded article is not particularly limited, and well-known molding methods can be adopted. Examples thereof include injection molding method, injection-compression molding method, extrusion molding method, profile extrusion method, transfer molding method, hollow molding method, gas-assisted hollow molding method, blow molding method, extrusion blow molding, IMC (in-mold coating molding) molding method, rotary molding method, multi-layer molding method, two-color molding method, insert molding method, sandwich molding method, foaming molding method, and pressure molding method.

The polyamide resin composition of an embodiment of the present invention is a resin material having a high wear resistance while maintaining a high mechanical strength, and thus the molded articles formed by molding this polyamide resin composition are preferably used as sliding parts.

Specific examples of the sliding parts include gear wheels, rotating shafts, bearings, various gears, and cams of electrical appliances, office equipment, and power equipment; end surfaces of mechanical seals; valve seats of valves; sealing members, such as V-rings, rod packings, piston rings, and rider rings; and rotating shafts, rotating sleeves, pistons, impellers, and rollers of compressors.

The resin composition of an embodiment of the present invention can have a notched charpy impact strength of 10 $kJ/m^2$ or greater in accordance with JIS K7111-1. The upper limit of the notched charpy impact strength is not particularly specified, but the strength is sufficiently at a practical level even when the upper limit is, for example, 20 $kJ/m^2$ or less and even 15 $kJ/m^2$ or less. The notched charpy impact strength in accordance with JIS K7111-1 is measured according to the method described in the examples mentioned below.

EXAMPLES

The present invention will be described more specifically by way of the following examples. The materials, used amounts, ratios, processing contents, processing procedures, and the like shown in the examples below may be changed as appropriate, as long as the change does not depart from the spirit of the present invention. Thus, the scope of the present invention is not limited to the specific examples described below.

Example 1

Synthetic Example of 1,4-BAC10

In a pressure-resistant reaction vessel having an internal volume of 50 L equipped with a stirrer, a partial condenser, a total condenser, a pressure regulator, a thermometer, a drop tank and a pump, an aspirator, a nitrogen-introducing tube, a bottom drain valve, and a strand die, precisely weighed 10000 g of sebacic acid (available from Itoh Oil Chemicals Co., Ltd.) (49.44 mol), 2.5 g of calcium hypophosphite (available from Kanto Chemical Co., Inc.) (0.015 mol), and 1.6 g of sodium acetate (available from Kanto Chemical Co., Ltd.) (0.02 mol) were introduced. The inside of the reaction vessel was sufficiently purged with nitrogen and then sealed, and the temperature was raised to 200° C. under stirring while keeping the pressure in the vessel at 0.4 MPaG. After the temperature reached 200° C., the dropwise addition of 7010 g of 1,4-bis(aminomethyl)cyclohexane (cis/trans molar ratio: cis/trans=15/85) (available from Mitsubishi Gas Chemical Company, Inc.) (49.53 mol) stored in the drop tank to the raw materials in the reaction vessel was started, and the temperature in the reaction vessel was raised to 300° C. while keeping the pressure in the vessel at 0.4 MPa and removing the generated condensed water out of the system. After the completion of the dropwise addition of 1,4-bis(aminomethyl)cyclohexane, the pressure in the reaction vessel gradually returned to normal pressure, and then the pressure in the vessel was reduced to 80 kPa using an aspirator to remove the condensed water. The stirring torque of the stirrer was observed during reducing the pressure, stirring was stopped when the desired torque was reached, and the inside of the reaction vessel was pressurized with nitrogen. The bottom drain valve was opened to extract the polymer from the strand die and to strand the polymer, and then the stranded polymer was cooled and pelletized with a pelletizer to obtain polyamide resin (polyamide resin pellets) having a number average molecular weight (Mn) of 12000.

The resulting polyamide resin was evaluated as follows.
Method of Measuring Phosphorus Atom Concentration and Calcium Atom Concentration First, 0.2 g of the polyamide resin and 8 mL of 35 mass % nitric acid aqueous solution were mixed, and microwave decomposition was carried out at 230° C. for 30 minutes. The resulting decomposition liquid was adjusted to a predetermined volume with ultrapure water to prepare the sample solution for ICP analysis. The phosphorus atom concentration and the calcium atom concentration in the polyamide resin were measured using an ICP analyzer.

The pellet-shaped polyamide resin obtained above was used as a sample for the measurement. The polyamide resin and the nitric acid aqueous solution were placed in a container made of modified polytetrafluoroethylene to carry out microwave decomposition. The microwave decomposition was carried out using ETHOS One available from Milestone General. ICPE-9000 available from Shimadzu Corporation was used as an ICP analyzer.
Method of Measuring Glass Transition Temperature (Tg), Melting Point (Tm), Crystallization Temperature (Tch, Tcc), and Amount of Melting Heat (Hm)

Differential scanning calorimetry measurements were carried out in accordance with JIS K7121 and K7122 using a differential scanning calorimeter. The polyamide resin pellets obtained above were crushed and put into a measurement pan of the differential scanning calorimeter and were pretreated by increasing the temperature to 300° C. at a rate of 10° C./min under a nitrogen atmosphere, followed by gradual cooling to 30° C. at a rate of 10° C./min. After this pretreatment, the sample was measured. The sample was measured in operating conditions of heating at a rate of 10° C./min and holding at 300° C. for 5 minutes, followed by cooling at a rate of −5° C./min to 100° C. to determine glass transition temperature (Tg), crystallization temperature on heating (Tch), crystallization temperature on cooling (Tcc), melting point (Tm), and amount of melting heat (Hm).

"DSC-60" available from Shimadzu Corporation was used as a differential scanning calorimeter.
Method of Measuring Crystallinity of Polyamide Resin
Preparation of Film The polyamide resin pellets obtained above were fed to a twin screw extruder with a T-die, melt-kneaded at a temperature of Tm+15° C., and a film having a thickness of 200 μm was obtained via the T die.

Measurement of Crystallinity

The polyamide resin was measured using an X-ray diffractometer (XRD) to determine the crystallinity based on the following calculation formula from the area of the obtained crystalline peak and the peak area in the non-crystalline state.

Crystallinity (%)=[area of crystalline peak/(area of crystalline peak+area of non-crystalline peak)]×100.

In this example, the polyamide resin film obtained above was used as the polyamide resin. In addition, SmartLab available from Rigaku Corporation was used as an X-ray diffractometer.

Preparation of Polyamide Resin Composition

For the polyamide resin obtained above, glass fibers (ECS03T-296GH available from Nippon Electric Glass Co., Ltd., chopped strand, weight average fiber diameter of 10 μm, and cut length of 3 mm) as the inorganic filler were fed into a twin screw extruder (TEM26SS available from Toshiba Machine Co., Ltd.) so that the mass ratio of the polyamide resin to the inorganic filler (polyamide resin/inorganic filler) was equal to the value shown in Table 1 and were melt-kneaded to prepare polyamide resin pellets. The glass fibers were fed into the twin screw extruder by a side feed. In addition, the extruder was operated at a setting temperature of 300° C.

Preparation of Test Piece

The polyamide resin pellets obtained by the manufacturing method described above were dried at 120° C. for 4 hours, and then were injection-molded using NEX140III available from Nissei Plastic Industrial Co., Ltd. into 4-mm thick ISO tensile test pieces. The injection-molded was carried out at a cylinder temperature of 300° C. and at a mold temperature of 130° C.

Appearance of Molded Article

The appearance of the resulting test piece (molded article) was visually observed.

A: Molded article with good appearance was obtained.
B: White turbidity was observed in the molded article.
C: The presence of foreign matter was observed in the molded article.

Specific Wear Rate

The polyamide resin pellets obtained by the manufacturing method described above were dried at 120° C. for 4 hours, and then were injection-molded using NS-40 available from Nissei Plastic Industrial Co., Ltd. into a hollow cylindrical test piece having a contact area of 2 cm$^2$. The injection-molded was carried out at a cylinder temperature of 300° C. and at a mold temperature of 130° C.

In accordance with JISK7218 (A) method, a friction wear test was carried out by rubbing the hollow cylindrical test pieces against each other under an environment of a temperature of 23° C. and a humidity of 50% and under conditions of a linear velocity of 100 mm/sec and a pressure load of 5 kgf for 20 hours to measure a specific wear rate for each of the test pieces of the same material, one placed on the fixed side and the other on the moving side of the testing apparatus. The specific wear rate was calculated by dividing the reduced volume of the test piece due to the wear by the total running distance and the pressure load.

Charpy Impact Strength

Using the test pieces obtained above, the notched charpy impact strength was measured in accordance with JIS K7111-1.

Example 2

Synthetic Example of 1,4-BAC10

A polyamide resin was obtained by the same procedures as in Example 1 except that 1,4-BAC having a cis:trans molar ratio of 30:70 was used, and the temperature in the reaction vessel was increased to 275° C. after the dropwise addition.

Evaluation

The resulting polyamide resin was evaluated as in Example 1.

Comparative Example 1

Synthetic Example of 1,4-BAC10

A polyamide resin was obtained by the same procedures as in Example 1, except that calcium hypophosphite was changed to 1.59 g of sodium hypophosphite (phosphorus atom concentration in the polyamide resin of 40 mass ppm).

Evaluation

The resulting polyamide resin was evaluated as in Example 1.

Comparative Example 2

Synthetic Example of 1,4-BAC10

A polyamide resin was obtained by the same procedures as in Example 1 except that 1,4-BAC having a cis:trans molar ratio of 38:62 was used, and the temperature in the reaction vessel was increased to 260° C. after the dropwise addition.

Evaluation

The resulting polyamide resin was evaluated as in Example 1.

TABLE 1

|  |  | Example 1 | Example 2 | Example 3 | Example 4 | Comparative Example 1 | Comparative Example 2 |
|---|---|---|---|---|---|---|---|
| cis/trans molar ratio of 1,4-BAC | | 15/85 | 30/70 | 30/70 | 30/70 | 15/85 | 38/62 |
| Hypophosphite | Sodium hypophosphite | | | | | Added | |
| | Calcium hypophosphite | Added | Added | Added | Added | | Added |
| | Phosphorus atom concentration (mass ppm) | 40 | 40 | 40 | 40 | 40 | 40 |
| | Molar amount of Ca atoms per 1 mole of P atoms | 0.5 | 0.5 | 0.5 | 0.5 | 0 | 0.5 |

TABLE 1-continued

|  |  | Example 1 | Example 2 | Example 3 | Example 4 | Comparative Example 1 | Comparative Example 2 |
|---|---|---|---|---|---|---|---|
| Thermal properties of polyamide resin | Tg (° C.) | 90 | 91 | 91 | 91 | 90 | 92 |
|  | Tch (° C.) | 123 | 136 | 136 | 136 | 125 | 143 |
|  | Tm (° C.) | 278 | 261 | 261 | 261 | 278 | 245 |
|  | Tcc (° C.) | 246 | 210 | 210 | 210 | 244 | 190 |
|  | Hm (J/g) | 80 | 63 | 63 | 63 | 60 | 63 |
| Crystallinity of polyamide resin |  | 42% | 36% | 36% | 36% | 28% | 30% |
| Polyamide resin/inorganic filler |  | 50/50 | 50/50 | 60/40 | 40/60 | 50/50 | 50/50 |
| Appearance of molded article |  | A | A | A | A | B | A |
| Specific wear rate ($\times 10^{-2}$ mm$^3$/kgf km) |  | 9 | 26 | — | 10 | — | 44 |
| Notched charpy impact strength (kJ/m$^2$) |  | 12.4 | 11.4 | 10.4 | 13.5 | — | 11.6 |

As is clear from the above results, use of the polyamide resin in which the calcium salt as the hypophosphite is used and which has a cis:trans molar ratio of 1,4-BAC from 35:65 to 0:100 (Examples 1 to 4) resulted in molded articles having an excellent wear resistance (low specific wear rate) while maintaining a high mechanical strength (Charpy impact strength). In contrast, in a case where the sodium salt was used as the hypophosphite (Comparative Example 1), although sufficient phosphorus component was blended during the synthesis of the resin, the sodium hypophosphite decomposed, the phosphorus component volatilized, and gelation occurred, resulting in a poor appearance of the obtained molded article. In a case where the trans ratio of 1,4-BAC was less than the range of the present invention (Comparative Example 2), wear resistance was remarkably inferior even though mechanical strength was high.

Furthermore, when the type of the glass fibers in Example 1 was changed to T-276GH available from Nippon Electric Glass Co., Ltd., and other procedures were carried out as in Example 1, the same performance as that of Example 1 was obtained.

Molded articles formed from the polyamide resin composition of the present invention has a high mechanical strength and an excellent wear resistance, and thus they can be suitably used in, for example, gear wheels, rotating shafts, bearings, various gears, and cams of electrical appliances, office equipment, and power equipment; end surfaces of mechanical seals; valve seats of valves; sealing members, such as V-rings, rod packings, piston rings, and rider rings; and rotating shafts, rotating sleeves, pistons, impellers, and rollers of compressors.

The invention claimed is:

1. A polyamide resin composition comprising a polyamide resin and an inorganic filler,
    wherein the polyamide resin comprises diamine-derived constituent units and dicarboxylic acid-derived constituent units;
    70 mol % or more of the diamine-derived constituent units are derived from 1,4-bis(aminomethyl)cyclohexane;
    a molar ratio of cis:trans of the 1,4-bis(aminomethyl) cyclohexane is from 35:65 to 0:100;
    70 mol % or more of the dicarboxylic acid-derived constituent units are derived from an am-linear aliphatic dicarboxylic acid having from 8 to 12 carbons; and
    the polyamide resin comprises phosphorus atoms in a concentration of from 20 to 100 mass ppm and comprises calcium atoms so as to be phosphorus atoms: calcium atoms of 1:0.3 to 0.7 in a molar ratio.

2. The polyamide resin composition according to claim 1, wherein the inorganic filler is an inorganic filler comprising glass as a main component.

3. The polyamide resin composition according to claim 1, wherein the inorganic filler is glass fiber.

4. The polyamide resin composition according to claim 1, comprising the inorganic filler in a ratio of from 35 to 65 mass % of the polyamide resin composition.

5. The polyamide resin composition according to claim 1, which is a pellet.

6. A molded article obtainable by molding the polyamide resin composition described in claim 1.

7. The molded article according to claim 6, wherein the molded article is a sliding part.

8. A method for manufacturing a polyamide resin pellet, the method comprising:
    adding an inorganic filler to a polyamide resin to form a mixture; and melt-kneading the mixture,
    wherein the polyamide resin comprises diamine-derived constituent units and dicarboxylic acid-derived constituent units;
    70 mol % or more of the diamine-derived constituent units are derived from 1,4-bis(aminomethyl)cyclohexane;
    a molar ratio of cis:trans of the 1,4-bis(aminomethyl) cyclohexane is from 35:65 to 0:100;
    70 mol % or more of the dicarboxylic acid-derived constituent units are derived from an α,ω-linear aliphatic dicarboxylic acid having from 8 to 12 carbons; and
    the polyamide resin comprises phosphorus atoms in a concentration of from 20 to 100 mass ppm and comprises calcium atoms in a molar ratio of phosphorus atoms:calcium atoms of 1:0.3 to 0.7.

* * * * *

UNITED STATES PATENT AND TRADEMARK OFFICE
CERTIFICATE OF CORRECTION

PATENT NO. : 11,078,330 B2  
APPLICATION NO. : 16/471799  
DATED : August 3, 2021  
INVENTOR(S) : Oguro et al.

It is certified that error appears in the above-identified patent and that said Letters Patent is hereby corrected as shown below:

In the Claims

Column 16, Line (18):  
In Claim 1, please delete "am-linear" and insert -- α,ω-linear --, therefor.

Signed and Sealed this  
Sixteenth Day of November, 2021

Drew Hirshfeld  
*Performing the Functions and Duties of the*  
*Under Secretary of Commerce for Intellectual Property and*  
*Director of the United States Patent and Trademark Office*